United States Patent
Dziuk et al.

[11] Patent Number: 5,348,414
[45] Date of Patent: Sep. 20, 1994

[54] CONNECTION SYSTEM FOR TWO STRUCTURAL COMPONENT PARTS CONSTRUCTED AS PIPE OR ROD AND/OR NODAL ELEMENTS

[75] Inventors: Richard Dziuk, Arolsen; Karl-Ludwig Wulfert, Waldeck, both of Fed. Rep. of Germany

[73] Assignee: Hewi Heinrich Wilke GmbH, Arolsen, Fed. Rep. of Germany

[21] Appl. No.: 839,949

[22] Filed: Feb. 21, 1992

[30] Foreign Application Priority Data

Feb. 26, 1991 [DE] Fed. Rep. of Germany ............ 9102252.5[U]

[51] Int. Cl.$^5$ ............................................ F16C 11/06
[52] U.S. Cl. ...................................... 403/90; 403/82; 403/116; 403/117; 285/264
[58] Field of Search ............. 403/82, 87, 91, 94, 403/61, 59, 116, 117, 90, 57, 170, 171, 174, 176; 256/67; 248/258, 288.5; 285/264

[56] References Cited

U.S. PATENT DOCUMENTS

| | | | |
|---|---|---|---|
| 424,572 | 4/1890 | Painter | 248/288.5 |
| 438,238 | 10/1890 | Jefferies et al. | 248/288.5 |
| 1,086,375 | 2/1914 | La France | 403/116 X |
| 1,864,534 | 6/1932 | Gulesian | 403/57 |
| 3,433,510 | 3/1969 | Hulterstrum | 403/90 X |
| 4,150,907 | 4/1979 | Thurnauer | 256/67 X |
| 4,637,193 | 1/1987 | Lange | 403/171 X |
| 4,767,232 | 8/1988 | Francis | 403/91 |
| 4,915,533 | 4/1990 | de la Haye | 403/171 |

FOREIGN PATENT DOCUMENTS

| | | |
|---|---|---|
| 3407767 | 9/1985 | Fed. Rep. of Germany . |
| 3604305 | 8/1987 | Fed. Rep. of Germany . |
| 3827142 | 2/1990 | Fed. Rep. of Germany ...... 403/171 |
| 9102252 | 5/1991 | Fed. Rep. of Germany . |
| 20648 | 1/1910 | United Kingdom . |

*Primary Examiner*—Randolph A. Reese
*Assistant Examiner*—Harry C. Kim
*Attorney, Agent, or Firm*—Michael J. Striker

[57] ABSTRACT

The invention is directed to a connection system for two structural component parts (1, 10) which are constructed as pipe or rod and/or nodal elements and contain connection ends (7, 15) having front recesses. An angle element (22) with a spherical surface (23) at which the two ends of a through-passage (32) penetrating the angle element (22) open out serves to adjust a multitude of angles ($\alpha$) between the structural component parts (1, 10), which angles ($\alpha$) can be changed preferably between preselected limits. The connection ends (7, 15) are provided in the area of the joint faces (24, 25) with contact surfaces (27, 28) adapted to the spherical surface (23) so that fine, hardly visible joint faces (24, 25) are formed between the structural component parts (1, 10) and the angle element (22). A connection element (21) which penetrates the through-passage (32) and is adaptable to the preselected angle is provided for producing a fixed connection or clamping of the angle element between the two structural component parts (FIG. 1).

13 Claims, 3 Drawing Sheets

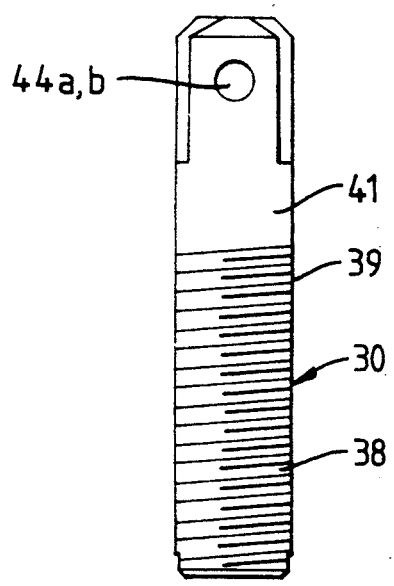
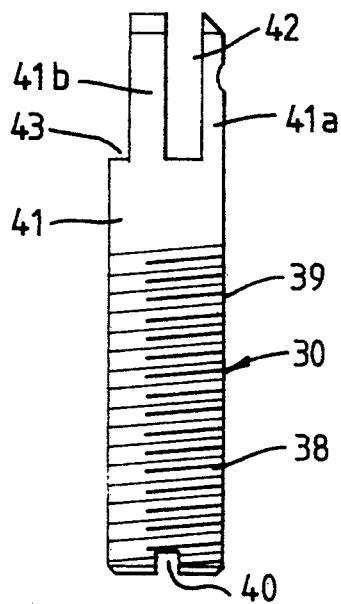
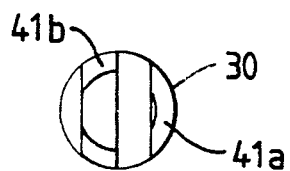
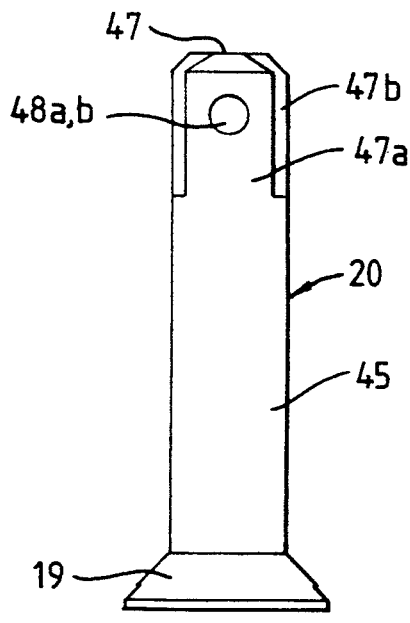
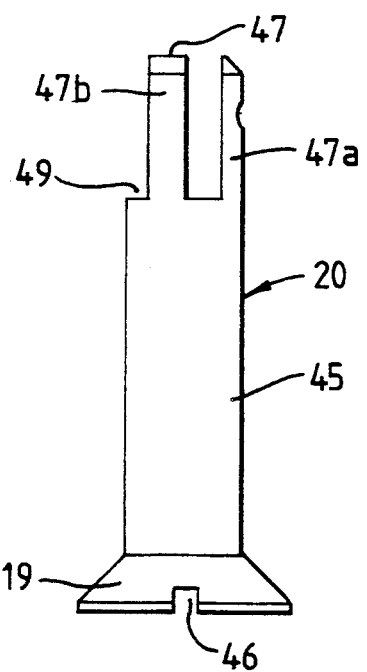

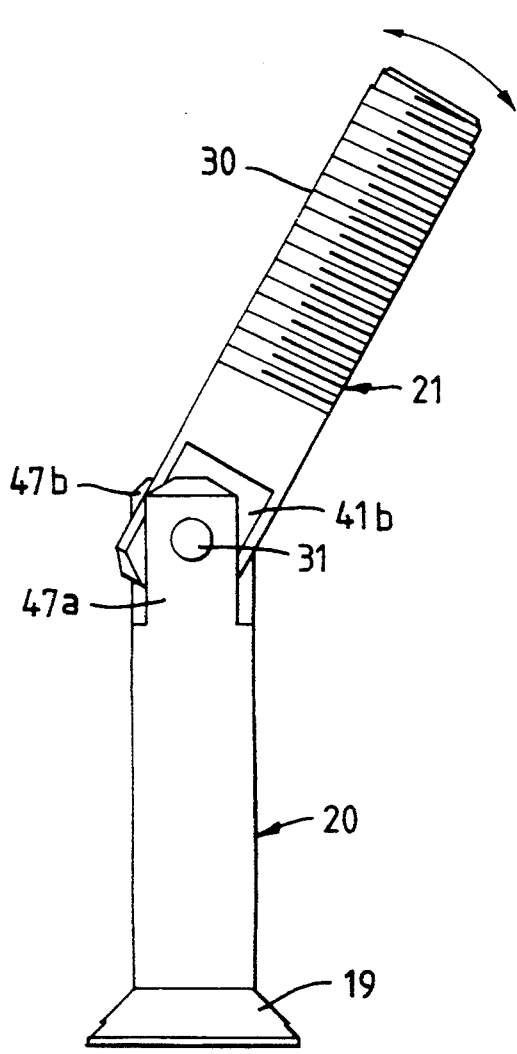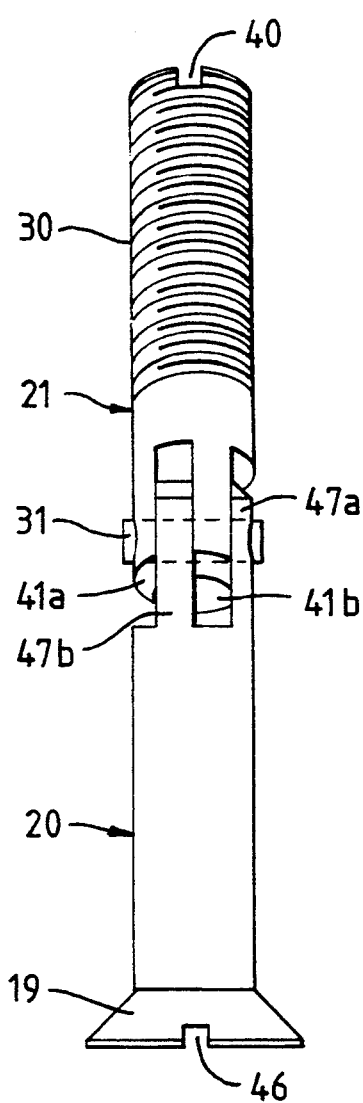

CONNECTION SYSTEM FOR TWO STRUCTURAL COMPONENT PARTS CONSTRUCTED AS PIPE OR ROD AND/OR NODAL ELEMENTS

The invention is directed to a connection system for two structural component parts which are constructed as pipe or rod and/or nodal elements and contain connection ends having front recesses and axes.

Two- or three-dimensional formations such as curtain rods, stair railings, handrails, decoration or furniture frames, fair and exposition stands or the like are often composed in a building block construction of pipe or rod systems containing round pipe or rod elements, or those provided with different cross sections, and nodal elements in the form of 90° arcs, bends, T-pieces, crosspieces or the like (DE-OS 26 32 696). The pipe elements are generally composed of plastic pipes which are produced by injection molding and have displaceably or immovably inserted steel inserts, whereas the nodal elements are composed of solid or tubular plastic parts which are likewise produced by injection molding and possibly provided with an immovable metal insert. Moreover, the pipe and nodal elements have connection ends with front recesses and possibly threaded parts which are supported in the connection ends and serve as invisible screw connections for the different structural component parts while forming precision joint faces.

With the known nodal elements it is often the case that only angles extending in an arc-shaped manner over approximate 90° or a multiple of this can be realized between the axes of the connection ends of adjoining structural component parts. If other angles are desired, as is frequently the case particularly in stair railings or handrails, as well as e.g. in the assembly of towel racks or curtain rods in rooms with at least partially sloping walls or ceilings, costly special manufactured parts must be provided. This is done either by providing a special angle element with corresponding connection ends for every angle in question or by shortening a 90° nodal element to the desired arc length or desired angle, and the connection end which is accordingly discarded is subsequently formed on again in an additional work step.

To prevent the resultant costs for additional injection molds or work steps, connection systems of the type mentioned above are already known (DE-OS 29 04 776). In these connection systems the angle element has at least one arc-shaped sleeve and the connection element projects through the sleeve, is constructed so as to be bent or swivelable or flexible in a corresponding manner and can accordingly be adapted to the bend or angle. To realize different arc lengths, e.g. those corresponding to angles of 12°, 15°, 17° and 18°, correspondingly constructed sleeves are provided and many different arcs and angles can be realized by combining a plurality of such sleeves. But this is undesirable for formal reasons because the use of a plurality of sleeves results in a corresponding number of additional joint faces, the angle can only be changed in a step-by-step manner, the combination of a plurality of sleeves results in a polygonal or zigzag arc rather than a circular arc, and finally every sleeve and possibly also the respective connection element again necessitates a special manufacturing.

In addition, it is also already known to produce angle elements with a preselected uniform length or a preselected uniform arc and to construct the angle element and its respective insert part in such a way that both are cut to the desired arc length or desired angle and are only then provided with the threaded parts or the like required in the particular case (DE-OS 33 06 830). This reduces production and storage to that of a few standard parts; and the parts to be cut off in the individual case, which must usually be discarded, are negligible. However, it is considered a disadvantage that additional work must be carried out at the construction location, the tools required for this purpose are not always available and incorrectly shortened angle elements and insert parts can rarely be used.

Accordingly, it is an object of this invention to provide a connection system of the type mentioned above in such a way that the desire angles can be changed in a continuous manner, at least within a preselected range.

A further object of this invention is to create a connection system without requiring a plurality of different angle elements.

A further problem underlying this invention is to provide a connection system such that there is no need to shorten or otherwise process standard structural component parts.

Yet another object of this invention is to design the connection system such that the parts used for producing the angles are easy to assemble and that it is possible to adjust the desired angle in a simple manner.

These and other objects are solved by a connection system comprising an angle element determined for the production of a preselected angle between the axes of the connection ends and cooperating with the connection ends accompanied by the formation of joint faces, said angle element having a spherical surface and a through-passage penetrating it; and a connection element which penetrates said through-passage, is adaptable to the preselected angle and has connection means determined for being anchored in the structural component parts, wherein the connection ends are provided in the area of said joint faces with contact surfaces adapted to said spherical surface.

The problem upon which the present invention is based is that of constructing the connection system of the generic type mentioned in the beginning in such a way that the desired angles can be changed in a continuous manner, at least within a preselected range, without requiring a plurality of different angle elements for this purpose or needing to shorten or otherwise process standard structural component parts. Moreover, the parts used for producing the angles are easy to assemble and make it possible to adjust the desired angle in a simple manner.

This problem is solved, according to the invention, by the characterizing features of claim 1.

The invention has the advantage that the two structural component parts joined by the angle element with spherical surface are brought into any desired angular position relative to one another in a continuous manner within limits substantially determined by the structural component parts and angle element themselves, but also by the connection element penetrating the angle element. No structural component parts are required in addition to the angle and connection elements and additional work at the construction site is also eliminated. Naturally it is also possible, as an alternative, to provide a plurality of different angle and connection elements to allow the realization of different adjustment areas.

The invention is explained in more detail in the following in connection with the attached drawing with reference to the embodiment example believed at the time to be the best:

FIGS. 4 to 6 show the front and side views and the top view of a first pin for producing the connection element according to FIG. 1, in enlarged scale;

FIGS. 7 and 8 show the front and side views of a second pin for producing the connection element according to FIG. 1, in enlarged scale; and FIGS. 9 and 10 show the front and side views of the connection element composed of the pin according to FIGS. 4 to 8.

Figure 1:
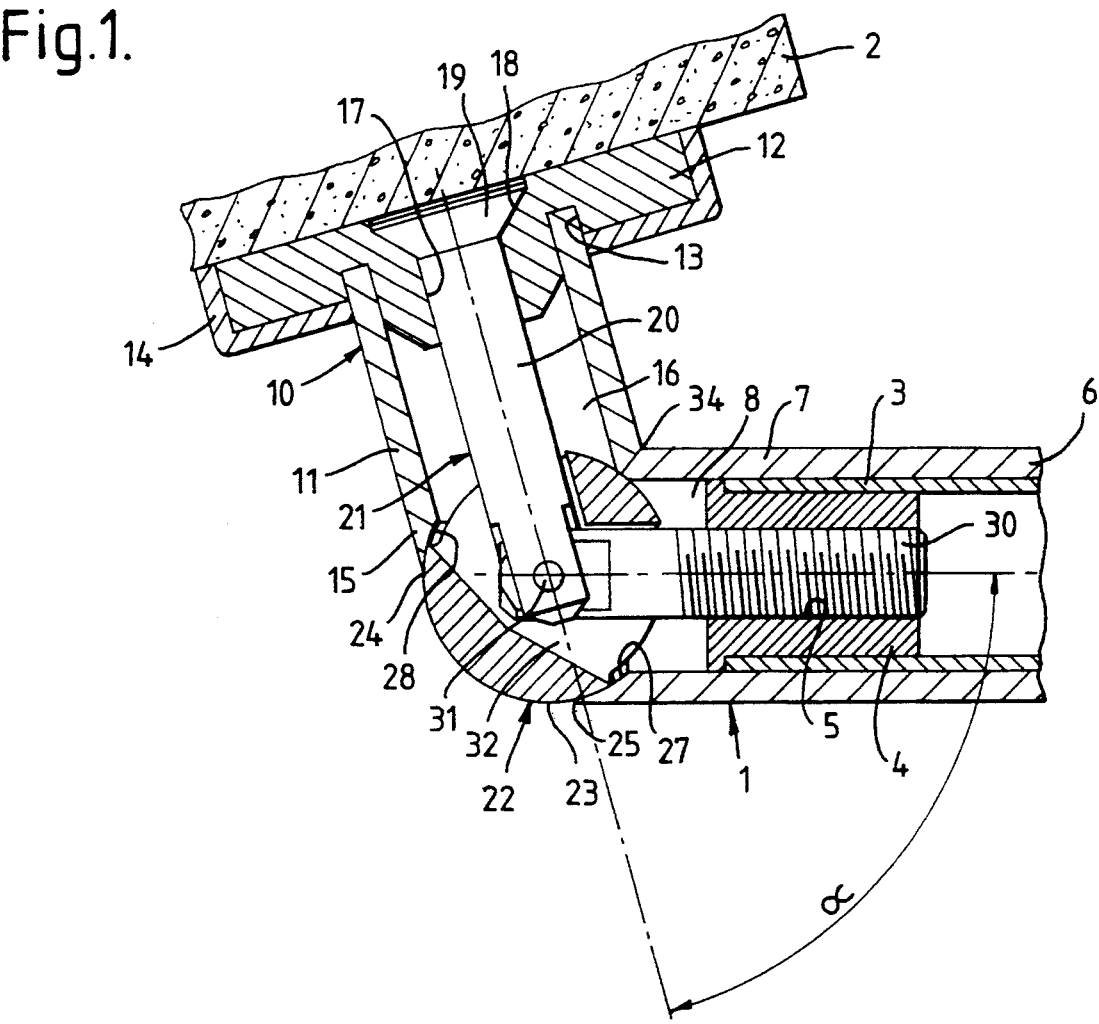
FIG. 1 shows a longitudinal section through a connection system having an angle and connection element according to a preferred embodiment form of the invention and being considered to be the best one up to now.

FIG. 1 shows a first structural component part 1 which is constructed as a pipe element and is to be used e.g. as a towel rack or curtain rod which is fastened at a sloping wall 2, ceiling or the like. The structural component part 1 has e.g. a cylindrical metal pipe 3 provided at one end with a hollow-cylindrical filling piece 4 which has an internal thread 5. The filling piece 4 is securely connected with the metal pipe 3 in a known manner e.g. by gluing, pinning or the like, and is made of metal or plastic. A cylindrical casing in the form of a plastic pipe 6 is fitted on the metal pipe 3 so as to be displaceable or immovable on the latter; one end of the plastic pipe 6 projects over the respective end of the metal pipe 3 and thereby forms a connection end 7 of the structural component part 1 which is provided with a front cylindrical receiving opening 8 so that the internal thread 5 forms a threaded part assigned to the connection end 7.

A structural component part 10, which is constructed in this case as a nodal element, serves to fasten the structural component part 1 at the wall 2. This structural component part 10 contains a short plastic pipe 11, a lower part 12 made of plastic or metal and having an annular groove 13 in which the rear end of the plastic pipe 11 is inserted, and a cover cap 14 which is placed on the plastic pipe 11 and can be clipped on to the lower part 12 in a known manner or fastened to the latter in some other way. The front end of the plastic pipe 11 forms another connection end 15 which is provided with a front, cylindrical receiving opening 16. In addition, the lower part 12 and the cover cap 14 form an anchor plate, known per se, for assembling the structural component parts 1 or 10 in question.

The lower part 12 has a planar rear side which comes to rest at the wall 2 and a plurality of screw holes, not shown, by means of which it can be fastened at the wall 2 before the cover cap 14 is placed on. Further, the lower part 12 has a central cylindrical passage 17 which is preferably arranged vertically relative to its rear side, runs within the annular groove 13 and passes at the rear end into a widened portion 18 extending up to the rear side. This widened portion 18 serves to support a head 19 of a pin or bolt 20 extensively without play by clamping the head 19 between itself and the wall 2 so as to be axially immovable when the lower part is mounted. The head 19 can be conical for example. The pin 20 projects into the passage 17 and the plastic pipe 11. The pin 20 is one part of a connection element which is designated in general by 21.

An angle element 22 is arranged between the two connection ends 7 and 15. The angle element 22 has a preferably spherical surface 23 and accordingly projects at least partially into the receiving openings 8 and 16, respectively, when it contacts the connection ends 7 and 15, respectively, while forming joint faces 24, 25. The connection ends 7 and 15 are provided in the area of the joint faces 24, 25 with contact surfaces 27 and 28 which are curved in a concave manner corresponding to the surface 23 so as to conceal any unsightly transitions or shoulders. If the diameter of the spherical surface 23 corresponds substantially to the outer diameter of the two plastic pipes 6 and 11, this not only results in almost invisible hairline joint faces 24 and 25, but the outer cylinder surfaces of the plastic pipes 6 and 11 also then open into the surface 23 in a substantially tangential manner so that the surface of the plastic pipes 6 and 11 and the surface 23 do not have any visible discontinuities even at a small distance if all surfaces are of the same color.

The pin 20 and an additional pin or bolt 30 serve for the secure connection of the structural component parts 1 and 10. The additional pin 30 constitutes the other part of the connection element 21, is constructed as a threaded pin and has an external thread which fits into the internal thread 5. The two pins 20, 30 are connected at assigned ends in an articulated manner by a peg or pivot 31 and arranged with the accordingly formed articulation in a through-passage 32 which substantially diametrically penetrates the angle element 22, has a diameter which is at least slightly larger than that of the pins 20, 30 and whose two ends open out at the surface 23. As shown in FIG. 1, the through-passage 32 in the special embodiment example is large enough so that the two pins 20, 30 and their axes can be swiveled relative to one another at an angle α which can lie e.g. between 0° and approximately 75°, as distinct from conventional 90° elbow elements.

The assembly of the structural component parts 1 and 10 is effected e.g. by first inserting the pin 20 into the passage 17 of the lower part 12 from the rear until the head 19 is arranged in the widened portion 18. The lower part 12 is now placed with its back to the wall 2 and securely fastened at the wall 2 by fastening screws, not shown. The plastic pipe 11 is then inserted into the annular groove 13, the closing cap 14 is pressed on the lower part 12, the pin 30 is connected with the pin 20 by the peg 31, and the angle element 22 is then pushed on until it contacts the connection end 15 or the contact surface 28 of the plastic pipe 11. The structural component part 1 is then screwed on the pin 30 by means of the internal thread 5 until its connection end 7 contacts the spherical surface 23 and the angle element 22 is securely clamped between the two structural component parts 1 and 10 while forming the joint faces 24 and 25. The specifically desired angle α between the axes of the pins 20 and 30 or between the connection ends 7 and 15 which are preferably coaxial relative to the latter can be produced shortly before the connection is completely tightened. For this purpose, the arrangement is advisably effected in such a way that the swivel axis of the peg 31 extends approximately through the center of the spherical surface 23.

As an alternative to this type of assembly, particularly if the other end of the structural component part 1, not visible in FIG. 1, is already fastened at the wall 2 by a nodal element, it is also possible to screw the pin 30 into the filling piece 4 by turning the pin 20 when the pins 20 and 30 are coaxially aligned. For this purpose it is advisable to provide means in its head 19 for applying a tool, e.g. a hexagon socket for a socket-screw wrench or a slot for a screwdriver blade.

Finally, it would be possible in this manner to first fasten a structural component part corresponding to the structural component part 10 at the two ends of the structural component part 1 so as to check and, if necessary, correct the angular positions to be produced before the connection is completely tightened and then to fasten the two lower parts 12 at the wall 2 and possibly at another, straight wall.

As shown in FIG. 1, the maximum swivel angle α can be fixed on the one hand in that the two connection ends 7 and 15 abut at one another along a short portion 34 of the joint faces 24 and 25. To enable this swivel position, the passage 22 must have a sufficiently wide cross section. On the other hand the through-passage 32 can also be provided with a cross section which is small enough so that the pins 20 and 30 strike against the end walls of the elongated hole-like through-passage 32 before the connection ends 7 and 15 contact one another so that in this case the cross section of the through-passage 32 determines the limits within which the angle α is adjustable.

The swivel area as a whole is also defined by the fact that the ends of the through-passage 32 are not to be visible from the outside at any desired position of the angle element 22.

Figure 2:
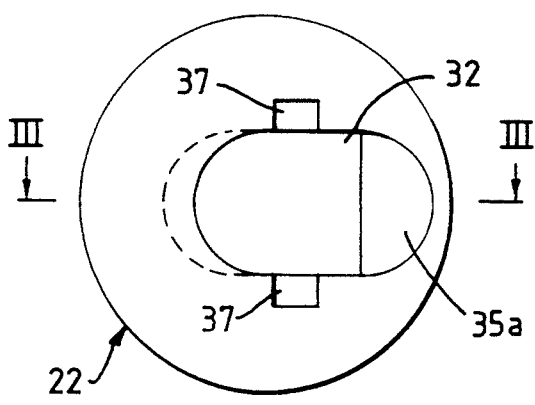
FIG. 2 shows a bottom view of a further embodiment of the angle element of the connection system according to FIG. 1 in enlarged scale.
Figure 3:
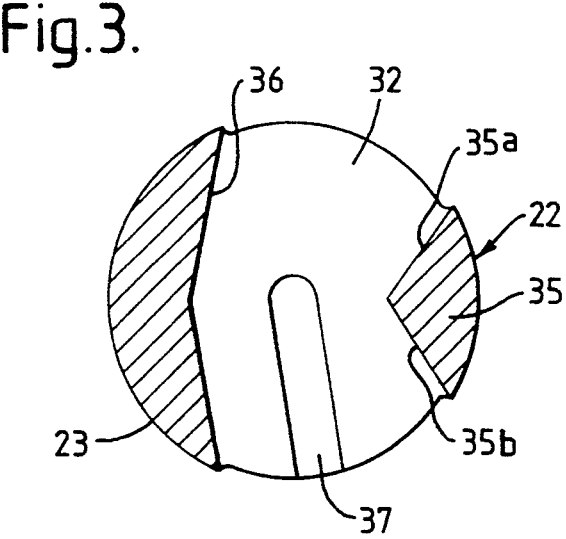
FIG. 3 shows a section along line III—III of FIG. 2.

Larger adjusting areas for the angle α result when using the angle element 22 which is only indicated in FIG. 1 and shown in enlarged scale in FIGS. 2 and 3. The through-passage 32 in this angle element 22 has an elongated hole-like cross section (FIG. 2) which is defined at one side by a wall 35 which has two parts 35a, b for the support of the two pins 20 and 30 in case (FIG. 1) the angle α is at its greatest value. In order that the connection ends 7, 15 do not impede the production of the maximum swivel angle α in this case, they are advisably provided in the area of the portion 34 with recesses constructed in the manner of bevels.

Beyond this, it can be seen from FIGS. 1 and 3 that the pins 20, 30 can be swiveled in the opposite direction only wide enough to correspond approximately to an angle α=0. Otherwise, the pins 20, 30 would either abut at a wall 36 which is located opposite the wall 35 and cannot be constructed corresponding to the wall 35 because otherwise the ends of the through-passage 32 adjoining the spherical surface 23 would appear too large and would therefore be at least partly visible from the outside, or the connection ends 7 and 15 which are preferably provided only at one side with bevel-like cut out portions would abut one another. This means that at least the larger angles can only be produced when the two plastic pipes occupy a rotational angle position relative to one another such that the bevel-like recesses lie opposite their connection ends 7 and 15 and when the angle element 22 simultaneously occupies an angular rotational position relative to the plastic pipes 6, 11 such that the wall 35 faces the portion 34 (FIG. 1). For this reason, the wall parts laterally adjoining the through-passage 32 are provided with parallel slots 37 (FIGS. 2 and 3) which receive lateral elongations of the peg 31 when the articulation of the two pins 20, 30 is inserted into the through-passage 32. The connection element 21 formed from the two pins 20, 30 is accordingly supported in the angle element 22 so as to be fixed against rotation relative to the latter, which considerably facilitates the correct arrangement of the angle element 22 relative to the structural component parts 1 and 10 during assembly.

In FIGS. 4 to 8, the pins 20 and 30 suitable for the purpose of the invention and being considered to be the best ones up to now are shown individually in enlarged scale. The pins 30 (FIGS. 4 to 6) have a portion 38 with an external thread 39 fitting into the internal thread 5 along the greater part of their length. If necessary, the portion 38 is provided at one end with means 40 for the application of a tool, e.g. a screwdriver blade, and at the other end adjoins a threadless portion 41 which has two axially parallel crosspieces 41a, b which are arranged in a comb-like manner and are separated from one another by a slot 42 extending up to the free ends of the crosspieces 41a, b. Moreover, the arrangement according to FIG. 5 is effected in such a way that the outer wall of one crosspiece 41a is substantially flush with the outer surface areas of the portion 38, while the outer wall of the other crosspiece 41b is radially offset toward the inside relative to the outer surface area of the portion 38 accompanied by the formation of a cut out portion 43. The cut out portion 43 is preferably at least exactly as large as the crosspiece 41a. Moreover, both crosspieces 41a, b are provided with centrally arranged coaxial cylindrical bore holes 44a, b (FIG. 4).

According to FIGS. 7 and 8, the pins 20 have a threadless, e.g. cylindrical shaft 45 which is provided at one end with the head 19 (FIGS. 1, 7, 8) and means 46 for receiving a tool and at the other end with a portion 47 which is substantially identical to the portion 41 of the pin 30 and also has corresponding crosspieces 47a, b with bore holes 48a, b and a cut out portion 49.

FIGS. 9 and 10 show the connection element 21 composed of the pins 20 and 30. The two pins 20, 30 are connected in such a way that the two portions 41, 47 are inserted one inside the other corresponding to FIG. 10. The crosspiece 41b comes to rest between the crosspieces 47a and 47b while the crosspiece 47b comes to rest between the crosspieces 41a and 41b and then the bore holes 44a, b and 48a, b are aligned relative to one another. The pin 31 (FIG. 1) is then inserted into the bore holes 44a, b and 48a, b so that the pins 20, 30 are swivelably connected with one another. Due to the cut out portions 43 and 49 which receive crosspieces 47a and 41a, respectively, the arrangement can be effected in such a way that the outer contour of the portions 41, 47 is no larger than the outer contour of the portions 38, 45 and a mechanically stable swiveling articulation is nevertheless obtained.

The invention is not limited to the described embodiment example which can be modified in many ways. In particular, it is possible to provide an oval or elliptical surface instead of a spherical surface of the angle element 22 insofar as this surface enables a continuous production of different angle positions. The expression "spherical" used in the description and the following claims is meant to include all these suitable surface. The use of angle elements with an entirely different shape is also conceivable, particularly if the structural component parts 1, 10 or their connection ends 7, 15 have e.g. hexagonal or octagonal, rather than circular cross sections. Moreover, instead of the connection element 21 as in DE-OS 29 04 776 connection elements having pins which are held together by chains or belts or other flexible elements can also be used. Of course, the structural component part 10 could be replaced by a structural component part corresponding to the structural component part 1 in the embodiment form according to FIG. 1, in which case the pin 20 need only be exchanged for a pin corresponding to the pin 30. Finally, it is also possible to replace the pins 20, 30 with sleeves having internal threads and to provide the connection ends 7 with filling pieces having threaded bolts which project forward and can be screwed into the sleeves. However, instead of such filling pieces, threaded rods can also be used which penetrate the entire structural component part 1, one end of the threaded rod e.g. being screwed into a swivelable sleeve assigned to the connection element 21 and the other end being screwed into a threaded part formed at the connection end of another nodal or pipe or rod element.

We claim:

1. Connection system for connection of two structural component parts containing connection ends having front recesses, axes and cylindrical outer surfaces, comprising:

an articulated connection element serving for connecting said structural component parts in selected ones of a plurality of possible angular positions between said axes and having connection means determined for being anchored with the structural component parts and for being inserted into the connection ends thereof;

and an angle element having a spherical surface and a through-passage receiving said connection element in said plurality of angular positions, said through passage having two ends ending at said spherical surface, and said angle element being mountable between said connection ends under a formation of joint faces with said spherical surface, wherein the connection ends are provided with concave curved contact surfaces for contacting said spherical surface in such a manner that said cylindrical outer surfaces open into said spherical surface substantially tangential when said structural component parts and said angle element are connected with each other by means of said connection element.

2. Connection system according to claim 1, wherein said connection means are two pins which are connected with one another in an articulated manner.

3. Connection system according to claim 2, wherein at least one of the pins is a threaded pin.

4. Connection system according to claim 2, wherein one of said pins has a head at a free end thereof.

5. Connection system according to claim 4, wherein said head is provided with means for application of a tool.

6. Connection system according to claim 1, wherein said connection ends of the structural component parts are constructed in a cylindrical manner and wherein said spherical surface has a diameter substantially corresponding to a diameter of said connection ends.

7. Connection system according to claim 1, wherein the through-passage and the connection element are provided with means for producing a connection between said connection element and said angle element such that said connection element and said angle element are fixed with respect to rotation relative to one another.

8. Connection system according to claim 1, wherein said through-passage has ends being defined by walls which cooperate with said connection element and fix two extreme angular positions between said two structural component parts.

9. Connection system according to claim 1, wherein said angle element and said connection element are connected with one another so as to be fixed with respect to rotation relative to one another.

10. Connection system according to claim 1, wherein said angle element is constructed for continuous adjustment of a multitude of angles ($\alpha$) between the structural component parts.

11. Connection system according to claim 1, wherein said angle element is constructed for adjusting an angle ($\alpha$) between two preselected limits.

12. Connection system according to claim 1, where said through-passage has an elongated hole-like cross-section and wherein said connection ends are provided in a region of said contact faces with cut out portions which can cooperate with each other in a manner of a miter.

13. Connection system according to claim 1, wherein the connection elements is provided with means for producing a connection between said connection element and said angle element such that said connection element and said angle element are fixed with respect to rotation relative to each other.

* * * * *